UNITED STATES PATENT OFFICE.

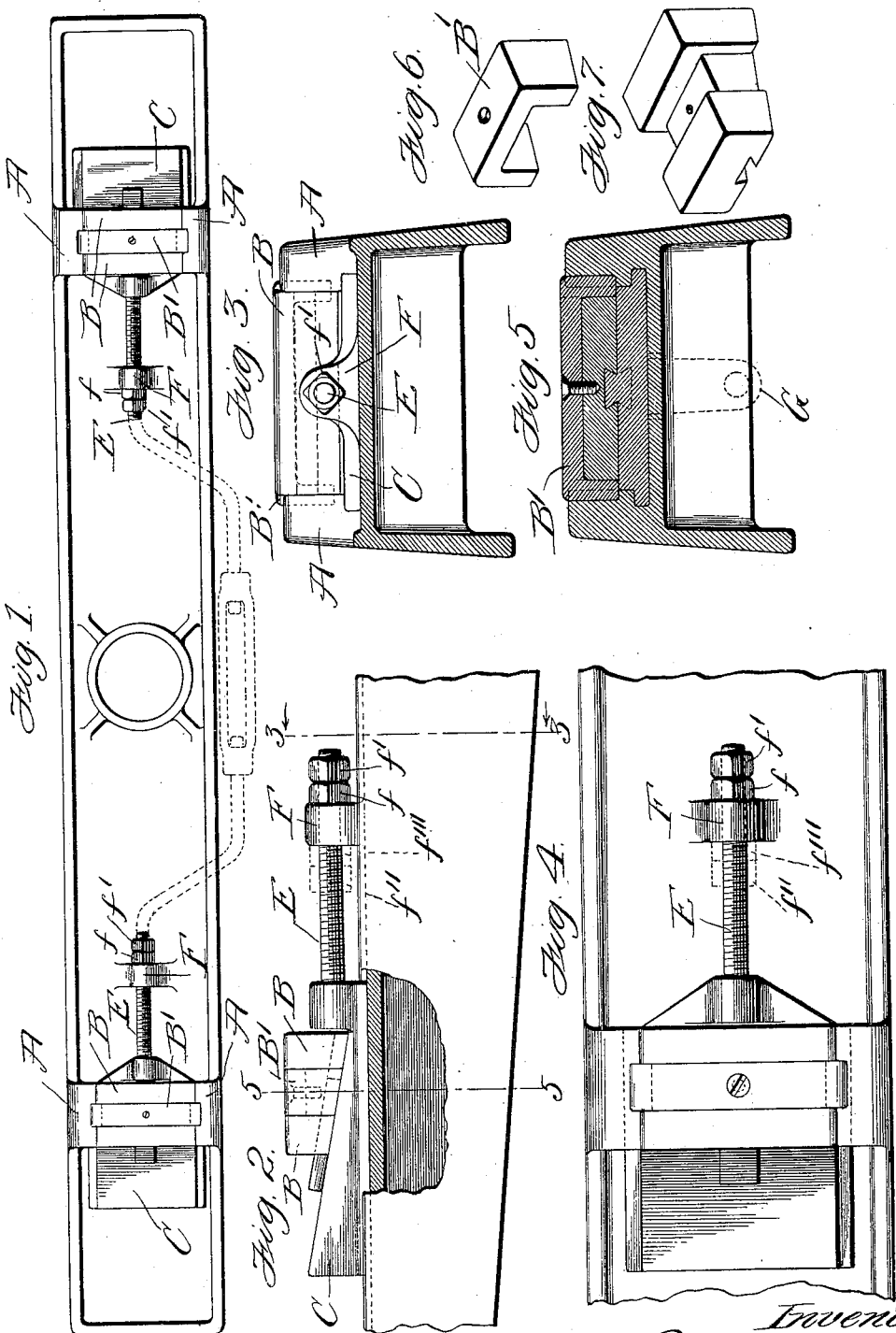

PETER H. MURPHY, OF EAST ST. LOUIS, ILLINOIS.

SIDE BEARING.

SPECIFICATION forming part of Letters Patent No. 611,925, dated October 4, 1898.

Application filed January 7, 1898. Serial No. 665,902. (No model.)

*To all whom it may concern:*

Be it known that I, PETER H. MURPHY, a citizen of the United States, residing at East St. Louis, in the county of St. Clair and State of Illinois, have made a certain new and useful Improvement in Side Bearings, of which the following is a full, clear, and exact description, such as will enable others skilled in the art to which it appertains to make and use the same, reference being had to the accompanying drawings, forming part of this specification, in which—

Figure 1 is a top plan view of a truck-bolster provided with my improved side bearings. Fig. 2 is an enlarged side elevational view, partly in cross-section, illustrating my improved side bearings. Fig. 3 is a sectional view through the bolster, illustrating my improved side bearings in end elevation, as seen from line 3 3, Fig. 2. Fig. 4 is a top plan view of my improved side bearings. Fig. 5 is a cross-sectional view through my improved bearing on line 5 5, Fig. 2. Fig. 6 is a detail view of the stirrup which coöperates with the upper wedge, and Fig. 7 is a detail view of the upper wedge.

This invention relates to a new and useful improvement in side bearings for railway rolling-stock, and is designed more particularly to be applied to the side bearings which are arranged on the truck-bolster.

It is well known that the car-body is pivotally mounted on a center bearing of the bolster and the side bearings are provided merely to arrest the side sagging of the car, and in practice it is designed that these side bearings shall not support any of the weight of the car-body except under abnormal conditions. In fact, railroad men aim to have the side bearings of the truck-bolster so arranged or so located relative to the bearings on the body-bolster of the car that they can see "daylight" between the two bearings. This is an ideal condition; but under heavy loads the car-body will settle or the bolster deflect, so that these side bearings will soon contact with each other and thus assist in supporting the load. Under such conditions in taking curves the trucks will not have the freedom of movement which is necessary, and it frequently happens that the trucks are bound to the car and that the car will be derailed by reason of the side bearings carrying a portion of the load.

My present invention has for its object the construction of side bearings which may be adjusted to accommodate the settling of the car and the various objectionable conditions which have to be met in this respect, so that the side bearings may be in proper relation with the car-body. I accomplish the above by means of a vertically-movable bearing-face, which I have termed the "side-bearing" block, which block is actuated by a cam-face, means being provided to lock this cam-face in position relative to said vertically-movable block in order that the side bearing may be adjusted to a nicety to accommodate itself to the bearing of the body-bolster above.

While I have shown my side bearing as being arranged on a steel truck-bolster, still I wish to be understood as not limiting myself to this construction of bolster, because it is obvious that my improved bearing can be mounted on a suitable plate and bolted to the ordinary wooden truck-bolster in use. Furthermore, I do not wish to be understood as limiting myself to the side bearings for the truck-bolster, as my improved bearing could as well be mounted on the body-bolster of the car.

In the drawings, A indicates vertically-disposed guideways, in which or between which is arranged the side-bearing block B.

C indicates a block arranged to coöperate with bearing-block B, each of said blocks being preferably provided with contacting cam-faces, so that when the block C is moved it will raise or lower the block B. The block C is designed to be moved in a horizontal direction and by the engagement of its cam-face with the cam-face on block B moves the block B in a vertical direction, as is well understood.

In order to prevent the block C from becoming displaced relative to the guideways A, I preferably form flanges on the lower side edges of said block, which run in grooves in said guideways A and thereby hold said block C to its seat, and in order to hold block B in position or in order to hold block B and prevent its being jarred from between the guideways A, I preferably groove said block B on its under side and form a dovetailed feather or spline on the cam-face of block C, fitting in the groove on block B, to hold the blocks together. An alternative construction would be to provide the block B with a T-shaped groove and tap the face of block C to receive one or more square-headed bolts to fit in said T-shaped groove. I prefer to form the groove on the under side of block B instead of the upper face of block C for the purpose of preventing an accumulation of dirt and cinders in said groove.

As block B is designed to move vertically, it must be held against horizontal movement in order to get the benefit of the contacting face of the cam when the block C is moved in a horizontal direction. I prefer therefore to form a key-seat in block B, as shown in Fig. 7, in which I introduce a stirrup or inverted-U-shaped key B', whose upper face when the same is in position on the block B is flush with said block, while its vertical members extend beyond the side edges of said block and engage grooves in the vertical guideways A. A single screw is all that is necessary to hold the key B' in position on the block. As it is necessary to make one of the interlocking devices between block B and the vertical guideways or the interlocking devices between the two blocks removable, I prefer to use this stirrup-shaped key instead of double-inclined key which might be used between the blocks, as illustrated by dotted lines in Fig. 5.

As a power medium for moving the block C, I have illustrated a threaded rod E, passing through a lug F, beyond which it receives nuts $f$ and $f'$, the latter of which is preferably a jam-nut. If desired, nuts $f''$ and $f'''$ may also be provided to coöperate with the inner face of lug F, as shown by dotted lines in Fig. 4, so as to hold the block C absolutely stationary.

By the above means I am enabled to adjust the bearing-blocks on each side independently of each other, and such is the preferred construction; but I may extend the rods E, as shown by dotted lines in Fig. 1, and thread the same into a turnbuckle, whereby both side bearings may be adjusted simultaneously. This turnbuckle is illustrated as being located to one side of the center bearing and above the truck; but, if desired, a lug may pass through a slot in the bolster, as shown at G, Fig. 5, which lug will be provided with a threaded rod, as heretofore described, said rod either engaging a lug on the under side of the bolster, where it may be locked in position by nuts, or said rod may engage a turnbuckle, as illustrated in Fig. 1.

While I have illustrated the side bearing in the drawings as being in its lowest position, it will be understood that under ordinary circumstances the bearing-block would be elevated when first introduced under a car and as the car sags said block would be lowered to accommodate said sagging.

I am aware that minor changes in the construction, arrangement, and combination of the several parts of my device can be made and substituted for those herein shown and described without in the least departing from the nature and principle of my invention.

Having thus described my invention, what I claim, and desire to secure by Letters Patent, is—

1. The combination with a bolster provided with vertical guideways, of a vertically-movable side bearing arranged between said guideways, a wedge coöperating with said bearing, and a dovetailed key on said wedge which coöperates with a correspondingly-shaped groove in the lower face of the side bearing to lock said parts together, substantially as described.

2. The combination with a vertically-movable side bearing, of vertical guideways for the same, a longitudinally-movable wedge coöperating with said side bearing, said wedge being provided with lateral flanges which engage grooves in the guideways, to lock said wedge against vertical movement relative to said guideways, means for locking said bearing against longitudinal movement, in said guideways, interlocking means between said side bearing and wedge, and means for moving and locking said longitudinally-movable wedge in an adjusted position, substantially as described.

3. The combination with vertically-grooved guideways, of a side bearing fitted in said grooved guideways, and a longitudinally-movable wedge having lateral flanges to engage horizontally-arranged grooves in said guideways, substantially as described.

4. The combination with vertically and horizontally grooved guideways, of a side bearing which engages said vertical grooves of said guideways, a wedge which engages the horizontal grooves of said guideways, means for moving said wedge and locking the same in an adjusted position, and interlocking means between said side bearing and wedge, substantially as described.

5. The combination with vertical guideways formed with a groove on their inner faces, a side bearing, and a removable key seated in said side bearing and engaging said groove in the vertical guideways, substantially as described.

6. The combination with suitable grooved guideways, of a side bearing vertically movable therein, a removable key seated in said side bearing and engaging the grooves in said vertical guideways, and means for moving said side bearing vertically, substantially as described.

7. The combination with grooved guideways A, of side bearing B, a removable key B' fitted to said side bearing and engaging the grooves in the guideways, a wedge C carrying a projection on its cam-face to engage a groove in the cam-face of the side bearing and lock said parts together against independent vertical movement, flanges on said wedge which fit in grooves in said vertical guideways, said flanges permitting longitudinal movement of said wedge, but preventing vertical movement thereof, and means for adjusting said wedge longitudinally and locking the same in an adjusted position, substantially as described.

In testimony whereof I have hereunto affixed my signature, in the presence of two witnesses, this 23d day of December, 1897.

PETER H. MURPHY.

Witnesses:
F. R. CORNWALL,
HUGH K. WAGNER.